(12) United States Patent
Hara (10) Patent No.: US 9,635,260 B2
(45) Date of Patent: Apr. 25, 2017

(54) IMAGE PROCESSING APPARATUS, IMAGE PICKUP APPARATUS, AND IMAGE PROCESSING METHOD

(71) Applicant: CANON KABUSHIKI KAISHA, Tokyo (JP)

(72) Inventor: Takayuki Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/994,760

(22) Filed: Jan. 13, 2016

(65) Prior Publication Data

US 2016/0212347 A1 Jul. 21, 2016

(30) Foreign Application Priority Data

Jan. 15, 2015 (JP) ................................. 2015-005791

(51) Int. Cl.
*H04N 5/232* (2006.01)
*H04N 5/217* (2011.01)
*H04N 5/353* (2011.01)
*H04N 5/357* (2011.01)

(52) U.S. Cl.
CPC ......... *H04N 5/23267* (2013.01); *H04N 5/217* (2013.01); *H04N 5/23254* (2013.01); *H04N 5/3532* (2013.01); *H04N 5/3572* (2013.01)

(58) Field of Classification Search
CPC ............... H04N 5/217; H04N 5/23254; H04N 5/23267; H04N 5/3532
See application file for complete search history.

(56) References Cited

U.S. PATENT DOCUMENTS

| | | | | |
|---|---|---|---|---|
| 2004/0130637 A1* | 7/2004 | Kake | ..................... | G06T 3/0093 348/239 |
| 2010/0177208 A1* | 7/2010 | Tamaru | ................. | G06T 7/0028 348/222.1 |
| 2014/0063321 A1* | 3/2014 | Nabeshima | ........... | G06F 3/0485 348/333.12 |
| 2014/0112634 A1 | 4/2014 | Yamamoto | | |
| 2014/0139751 A1* | 5/2014 | Narikawa | ............... | G06T 3/005 348/789 |
| 2014/0176755 A1* | 6/2014 | Narita | ..................... | G06T 5/006 348/222.1 |

FOREIGN PATENT DOCUMENTS

| | | |
|---|---|---|
| JP | 2011-233985 A | 11/2011 |
| JP | 2012-249158 A | 12/2012 |

* cited by examiner

*Primary Examiner* — Amy Hsu
(74) *Attorney, Agent, or Firm* — Cowan, Liebowitz & Latman, P.C.

(57) ABSTRACT

An imaging sensor unit captures a subject through an optical system. A compression unit compresses image data continuously acquired from the image sensor unit to output to a recording unit. A feature amount extraction unit extracts a feature amount for each pixel of the image data and a coordinate selection unit selects a plurality of coordinates having a relatively high feature amount. A movement detection unit detects a movement vector of coordinate points according to the plurality of coordinates selected by the coordinate selection unit. A geometric deformation parameter generation unit generates a geometric deformation parameter based on the movement vector and lens information for the optical system. The recording unit records the geometric deformation parameter in association with the image data compressed by the compression unit (each frame of the image data).

12 Claims, 7 Drawing Sheets

FIG. 5A $$r = \sqrt{(x - (Ox+Sx))^2 + (y - (Oy+Sy))^2}$$

IMAGE PROCESSING APPARATUS, IMAGE PICKUP APPARATUS, AND IMAGE PROCESSING METHOD

BACKGROUND OF THE INVENTION

Field of the Invention

The invention relates to a technique of compressing image data and recording the image data in association with additional information.

Description of the Related Art

In recent years, in the cinema photographing and the like, the requirement for later processing without losing image quality for recorded moving image data has increased. To meet such requirements, a device that can handle data in a RAW format is proposed for the moving image. For example, the device disclosed in Japanese Patent Laid-Open No. 2011-233985 performs RAW moving image capture for sequentially recording the image data before development obtained from an image sensor without developing in moving image capture. By performing a RAW development processing, development parameters can be changed later and the image quality is prevented from deterioration.

In addition, for example, a gyro sensor for detecting camera motion or attitude, or the like is mounted as a sensor other than an imaging sensor configured to acquire the image data for recording on a recent camera. The device disclosed in Japanese Patent Laid-Open No. 2012-249158 can perform moving image processing using sensor information later by adding the sensor information to the recorded moving image data.

However, if the information detected by the various sensors is directly added to the image data, the amount of information is enormous. Furthermore, there is a camera system with a correction mechanism for performing vibration stabilization (an image shake correction) by the movement of the lens constituting the imaging optical system or the imaging sensor. In this case, not only the information relating to the image stabilization as the detected information by the various sensors, but also the information relating to the correction mechanism mast be added. Therefore, since the additional information about the moving image data is further increased, the amount of information is enlarged. Besides, if information about lens characteristics changed by a photographer operating the lens mechanism with aberration of the optical system also included, the additional information is even more enormous.

SUMMARY OF THE INVENTION

The present invention suppresses an increase in the amount of information in the case where the image data is recorded together with additional information.

According to the invention, an image processing apparatus is provided that includes a compression unit configured to compress image data of an image captured through an optical system; an extraction unit configured to acquire the image data and extract a feature amount of the image; a coordinate selection unit configured to acquire the feature amount extracted by the extraction unit and select a plurality of coordinates having a relatively high feature amount; a movement detection unit configured to detect a movement of coordinate points according to the plurality of coordinates selected by the coordinate selection unit; a generation unit configured to acquire the movement of the coordinate points detected by the movement detection unit and lens information according to the optical system to generate a geometric deformation parameter; and a recording unit configured to record the geometric deformation parameter generated by the generation unit as additional information in association with each frame, for the image data compressed by the compression unit.

According to the invention, an increase in the amount of information in the case where the image data is recorded together with additional information can be suppressed.

Further features of the invention will become apparent from the following description of exemplary embodiments with reference to the attached drawings.

DESCRIPTION OF THE EMBODIMENTS

Figure 1:
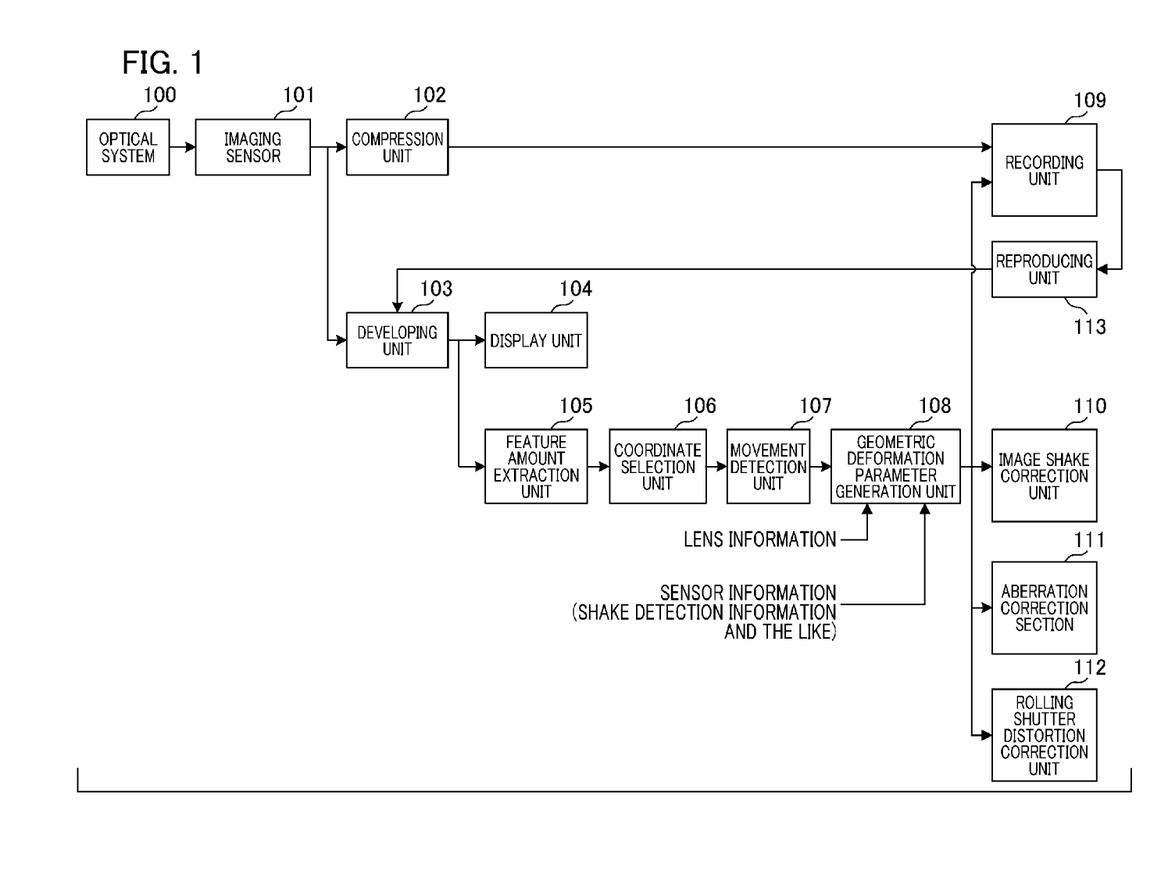
FIG. 1 is a block diagram illustrating a configuration example of a device according to an embodiment of the present invention.

Hereinafter, preferred embodiments of the invention will be described with reference to the drawings. FIG. 1 is a block diagram illustrating a configuration example of an image pickup apparatus according to the present embodiment. An optical system 100 is an imaging optical system comprising an optical member such as a lens, an aperture, and the like. The optical system 100 is an optical system with an optical aberration of the lens and comprises an optical correction mechanism for performing image shake correction to a camera shake. An imaging sensor 101 comprises an imaging element that photoelectrically converts an object image focused through the optical system 100 and outputs an image signal.

A compression unit 102 acquires the image signal continuously obtained from the imaging sensor unit 101, and performs compression processing of the image data. Note that, an embodiment for performing only a lossless compression or an embodiment for performing only a lossy compression may be used. A general information compression technique may be used, and since a compression algorithm is not a feature of the present invention, the description thereof is omitted.

A developing unit 103 acquires the image signal continuously obtained from the imaging sensor unit 101 and performs developing processing of the image data. A common imaging sensor is imaged in a mosaic state, such as a Bayer array. In this case, the developing unit 103 performs de-mosaic processing, gamma correction, and the like, and then performs processing for converting to the image data that can be displayed on a display unit 104. Such conversion processing is referred to as "developing processing". The display unit 104 displays an image according to the image data after the developing processing. That is, the image data on which the developing processing is performed by the developing unit 103 is provided to the photographer by displaying the image.

A feature amount extraction unit 105 acquires the image data after the developing processing from the developing unit 103 and extracts a feature value for each pixel. In the extraction of the feature value, processing for calculating and extracting the feature value of the image for each pixel is carried out. The description of the details of this calculation and extraction will be described below.

A coordinate selection unit 106 selects a reference coordinate for obtaining the geometric deformation parameters based on the feature value extracted by the feature amount extraction unit 105. A plurality of coordinates having a high feature value is selected among the feature values acquired from the feature amount extraction unit 105. The description of the details of the coordinate selection processing will be described below. A movement detection unit 107 detects a movement vector of the plurality of coordinates selected by the coordinate selection unit 106. More specifically, the movement detection unit 107 detects the movement vector of the coordinate selected by the coordinate selection unit 106 by comparing one previous image data with the current image data in a time sequence.

A geometric deformation parameter generation unit 108 generates the geometric deformation parameter based on the movement vector detected by the movement detection unit 107, lens information provided in the optical system 100, and a variety of sensor information. The lens information is information such as the characteristic and aberration of lenses constituting the optical system 100 (zoom lens or the like). Also, the variety of sensor information is detection information by an angular velocity sensor for outputting a shake detection signal of the device. More specifically, a reference position shift amount is calculated by a geometrical correction of electronic image stabilization and various optical aberrations and a rolling shutter distortion correction for the coordinate selected by the coordinate selection unit 106. This reference position shift amount is output as the geometric deformation parameter.

A recording unit 109 records the image data (the compressed image data) compressed by the compression unit 102 in association with the geometric deformation parameter generated by the geometric deformation parameter generation unit 108 in a storage medium. The associated compressed image data and the geometric deformation parameter are recorded in the storage medium in accordance with a predetermined format which will be described below.

An image shake correction unit 110 acquires the geometric deformation parameter generated by the geometric deformation parameter generation unit 108 and the shake detection signal by the angular velocity sensor and the like, detects the movement of the image from the image data acquired by the imaging sensor unit 101, and then corrects the image shake of the image. In the case of the electronic image stabilization, the processing for correcting the image shake caused by the influence of camera shake by an electronic processing (an image processing) is performed. Also, in the case of the optical image stabilization, the processing for correcting the image shake by the movement of the optical member or the optical element such as the correction lens and the imaging element is performed. In the present embodiment, both of the electronic image stabilization is used in combination with the optical image stabilization.

An aberration correction section 111 performs geometric correction processing of the optical aberration in accordance with the geometric deformation parameter generated by the geometric deformation parameter generation unit 108. For example, the distortion aberration correction, the chromatic aberration of magnification correction, and the like are included in the optical aberration correction.

A rolling shutter distortion correction unit 112 acquires the geometric deformation parameter generated by the geometric deformation parameter generation unit 108, and automatically corrects the rolling shutter distortion in a known manner. Rolling shutter distortion is a phenomenon in which the distortion occurs in the object image in a case where a quick moving object or the like is imaged by the imaging sensor in the rolling shutter method. The rolling shutter distortion correction unit 112 calculates the distortion correction amount corresponding to the detected amount of the rolling shutter distortion, and corrects the image data acquired by the imaging element.

Figure 2:
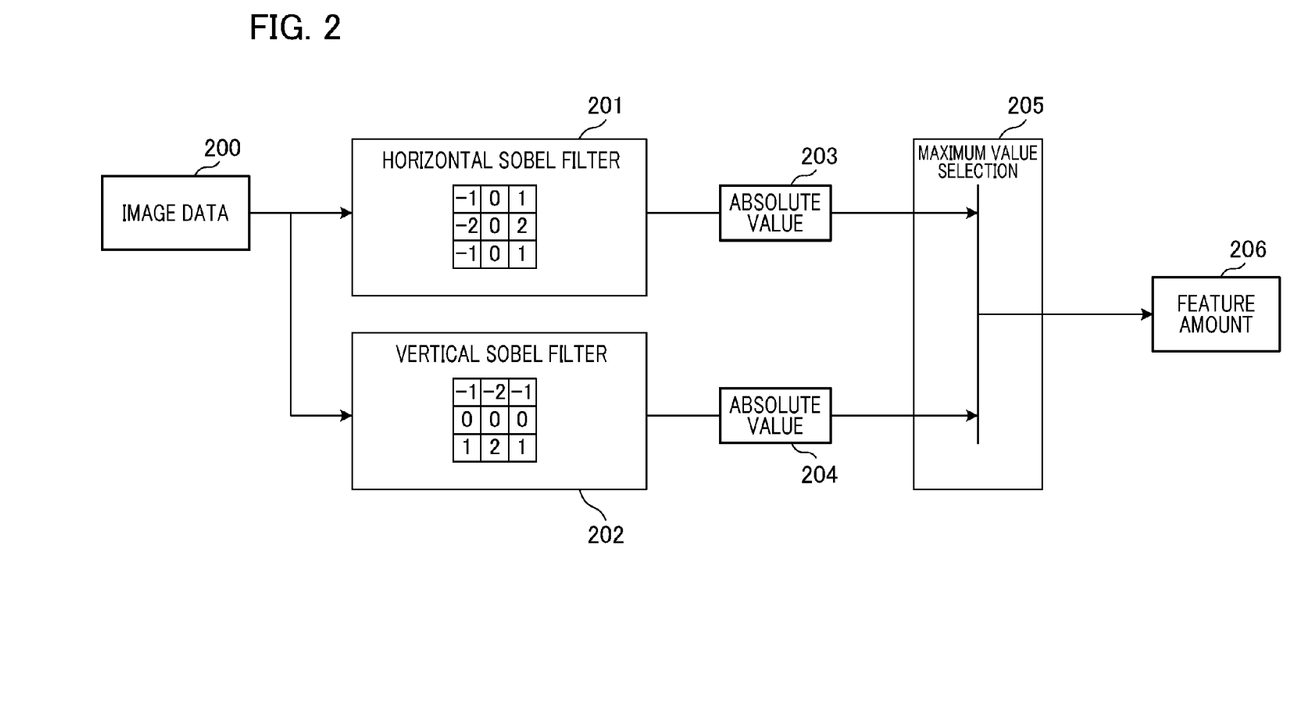
FIG. 2 is a diagram illustrating a feature point extraction by the Sobel filter.

Next, the description of the extraction processing of the feature value and the coordinate selection processing will be described in detail. The feature value serves as a region where the movement in the image is noticeable, a region where the various optical aberrations are noticeable, and a region where the rolling shutter distortion is noticeable. Note that these are all cases of performing the correction, and if the rolling shutter distortion correction is not performed, the region where the rolling shutter distortion is noticeable need not be served. These regions have the tendency that the rolling shutter distortion is generally noticeable at the edge of the object image. Therefore, it is more effective to use a result of Sobel filter processing as shown in FIG. 2 or a feature amount calculation method of a Harris operator or Shi•Tomasi if the system has an excess of the calculation resources. In the present embodiment, the description in the case where the Sobel filter is used will be described with reference to FIG. 2. The Sobel filter is a filter for calculating a spatial first-order differential to detect an outline.

Image data 200 in FIG. 2 corresponds to the image data output by the developing unit 103 in FIG. 1. The image data 200 is input to a horizontal Sobel filter 201, and converts the data on which the filter processing has been performed to an absolute value by an absolute value processing unit 203. Similarly, a vertical Sobel filter 202 processes the image data 200, and converts the data in which the filter processing has been performed to an absolute value by an absolute value processing unit 204. Each output of the absolute value processing units 203 and 204 is input to a selection processing unit 205. Then the output of the larger one is selected (a maximum value selection). That is, the selection processing unit 205 compares the output value of the absolute value processing unit 203 with the output value of the absolute value processing unit 204, and outputs the larger one as a feature amount 206. Therefore, either output value is selected among the outputs each processed by the plurality of filters, and then the feature amount is extracted.

Figure 3:
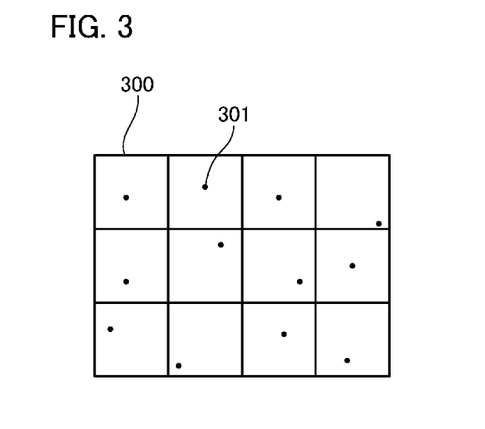
FIG. 3 is a diagram illustrating a coordinate selection processing performed by an area dividing.

Next, the coordinate selection processing will be described with reference to FIG. 3. In the present embodiment, the image data group is divided into a predetermined number of regions, and the processing for calculating the coordinate for which the feature amount for each divided region is a maximum feature amount is performed. FIG. 3 illustrates a rectangular division example of a case where the image data group is divided into four in the horizontal direction (the lateral direction in FIG. 3) and is divided into three in the vertical direction (the perpendicular direction in FIG. 3). The coordinate selection unit 106 calculates one characteristic maximum point in the divided region 301 with respect to one of the divided regions 300. In FIG. 3, the characteristic maximum point in the divided region 301 (hereinafter, referred to as a "characteristic maximum point") is shown by a black dot, and the coordinate is a coordinate indicating the maximum value of the feature amount in the divided region. Note that in the present embodiment, the processing for selecting the single coordinate point having the maximum value of the feature amount as the coordinate having relatively high feature amount in the divided region is shown as an example. However, the processing for selecting a plurality of coordinate points as needed may be used.

Figure 4:
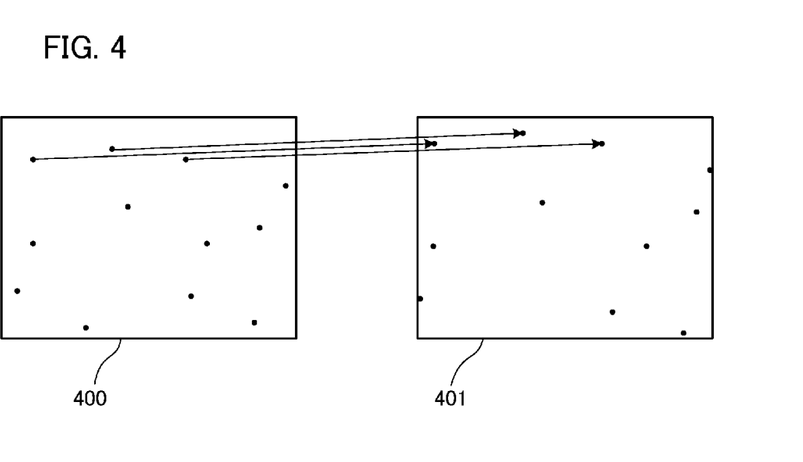
FIG. 4 is a diagram illustrating a correspondence relationship between image data and a coordinate movement destination due to a geometric deformation.
Figure 5A:
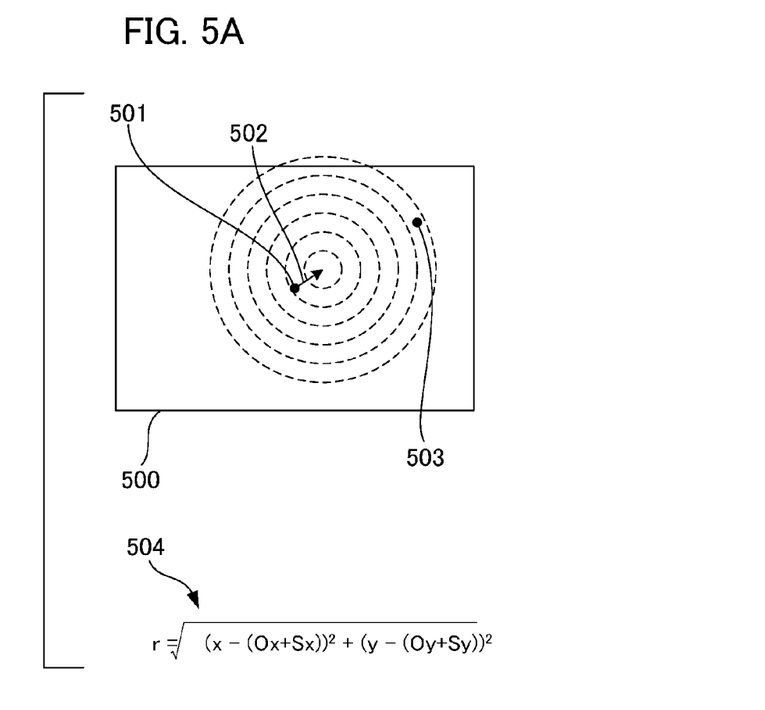
FIGS. 5A and 5B are diagrams illustrating a processing example of a calculation of an image height and a distortion correction.
Figure 5B:
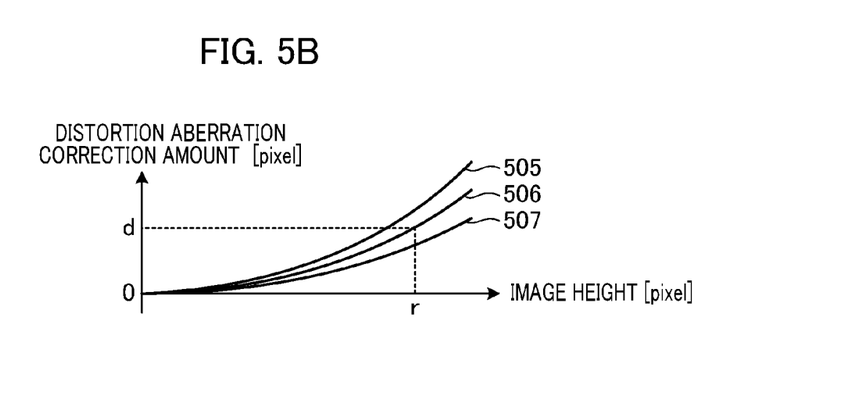

The geometric deformation parameter generation unit 108 calculates the output coordinate for referring to the characteristic maximum point 301 if a desired geometric deformation is performed. FIG. 4 is a conceptual diagram illustrating an image of a correspondence relationship. The left side in FIG. 4 illustrates image data 400 before the geometric deformation, and the right side in FIG. 4 illustrates image data after the geometric deformation 401. The coordinates on the image data 400 are the coordinates selected by the method described in FIG. 3, and the geometric deformation parameter generation unit 108 calculates the coordinates of the point on the image data after the geometric deformation 401 corresponding to the coordinates. At this time, for example, it is assumed that the aberration correction unit 111 performs the distortion aberration correction. In this case, an image height is calculated based on an optical axis central coordinate of the correction lens that is offset from the center of the image by the correction mechanism of the optical system 100, and further comprehends the state of the current lens to calculate the amount of distortion with respect to the image height. The correction amount is acquired by this processing. The specific processing will be described with reference to FIGS. 5A and 5B. FIG. 5A is a diagram illustrating a calculation processing of the image height, and FIG. 5B is a diagram illustrating a calculation processing of a distortion correction.

In image data 500 shown in FIG. 5A, the coordinates of an image center point 501 are indicated as (Ox, Oy), and a center shift amount 502 in a case where the shift occurs in the center of the image at the image shake correction by the correction mechanism of the optical system 100 is indicated as (Sx, Sy). A focused coordinate 503 on the image is indicated as (x, y), and a formula 504 for the image height calculation is indicated below if the image height is indicated as "r".

$$r = \sqrt{(x-(Ox+Sx))^2 + (y-(Oy+Sy))^2} \quad \text{[formula 1]}$$

The image height "r" is calculated taking into consideration of the center shift amount 502 (Sx, Sy), which is a shift movement amount by the correction mechanism of the optical system 100.

Next, the processing for calculating the distortion aberration correction amount is performed with reference to a distortion aberration correction amount table (see 505 to 507). The horizontal axis in FIG. 5B indicates the image height (unit: pixel), and the vertical axis indicates the distortion aberration correction amount (unit: pixel). Graph curves 505 to 507 show graphically each data of the distortion aberration correction amount, and show the distortion aberration correction amount corresponding to each of zoom positions "a", "b", and "c". The graph curve corresponding to a current zoom position, i.e., the distortion aberration correction amount table is selected, and a correction amount "d" corresponding to the image height "r", which has been calculated, is calculated by the direct or interpolation calculation.

Next, the processing for separating the correction amount "d" into each of its components in the x axis direction and the y-axis direction, and adding the correction amount "d" to each component of a focused coordinate 503. The coordinate (x*, y*) after the distortion aberration correction is calculated using a following formula.

$$x^* = x + d \cdot \cos(\arctan(y-(Oy+Sy), x-(Ox+Sx)))$$

$$y^* = y + d \cdot \sin(\arctan(y-(Oy+Sy), x-(Ox+Sx))) \quad \text{[formula 2]}$$

The arctan(Y, X) in the above formula indicates arctangent function of Y/X. Note that, although the same processing is performed in a case where the chromatic aberration of magnification is performed, in this case, the center shift amount is different for each color component of R (red)·G (green)·B (blue), and thus the center shift amount is needed to individually calculate for each color.

Figure 8:
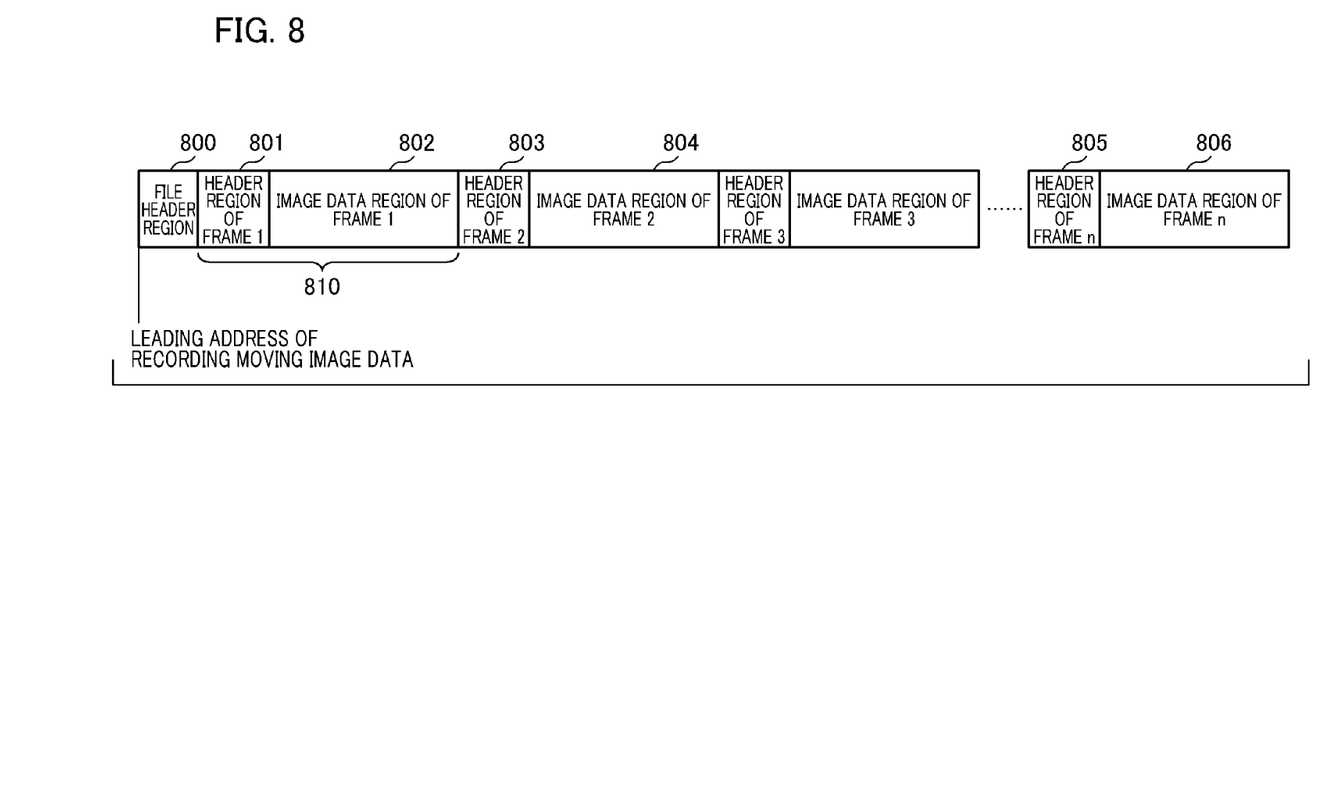
FIG. 8 is a diagram illustrating a file structure of a file recorded in a storage medium.

In this manner, the storage processing for the storage medium is performed for the compressed image (the RAW moving image) to be recorded in association with the data of the calculated coordinate value after the processing for calculating the output coordinate for the coordinate of the input image of the geometric deformation processing. FIG. 8 is a diagram illustrating a file image on the storage medium in the case where the data of the coordinate value in association with the image data is recorded. The following region is arranged as the reference to the leading address of recording moving image data.

File header region (800): this is a region in which information which is present the predetermined number for the entire RAW moving image such as the number of all frames of the RAW moving image and the frame size is recorded, and is positioned at the leading of the recorded file.

Frame information region (810): this is a region constituted by a pair of the region of the frame header and the region of the frame image data.

If the number of recording frame is "n", n regions are recorded in a frame information region 810 following the file header region 800. The geometric deformation parameter calculated by the above method is recorded in a frame header region, and RAW compression image data is recorded in a frame image data region. For example, a first frame information region is composed of a header region of frame 1 (801) and an image data region of frame 1 (802). In this case, the geometric deformation parameter corresponding to the RAW compression image data recorded in the image data region of frame 1 (802) is recorded in the header region of frame 1 (801). Similarly, in a second frame information region, the geometric deformation parameter corresponding to the RAW compression image data recorded in the image data region of frame 2 (804) is recorded in the header region of frame 2 (803).

Figure 9A:
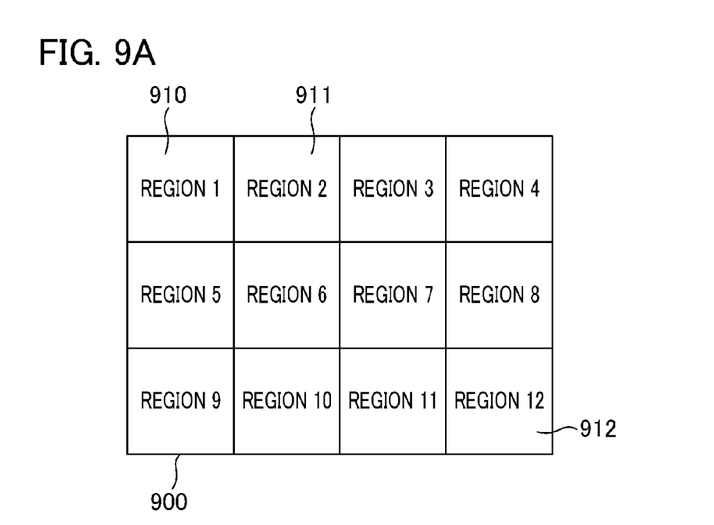
FIGS. 9A and 9B are diagrams illustrating a geometric deformation parameter to be recorded in a frame header segment.
Figure 9B:
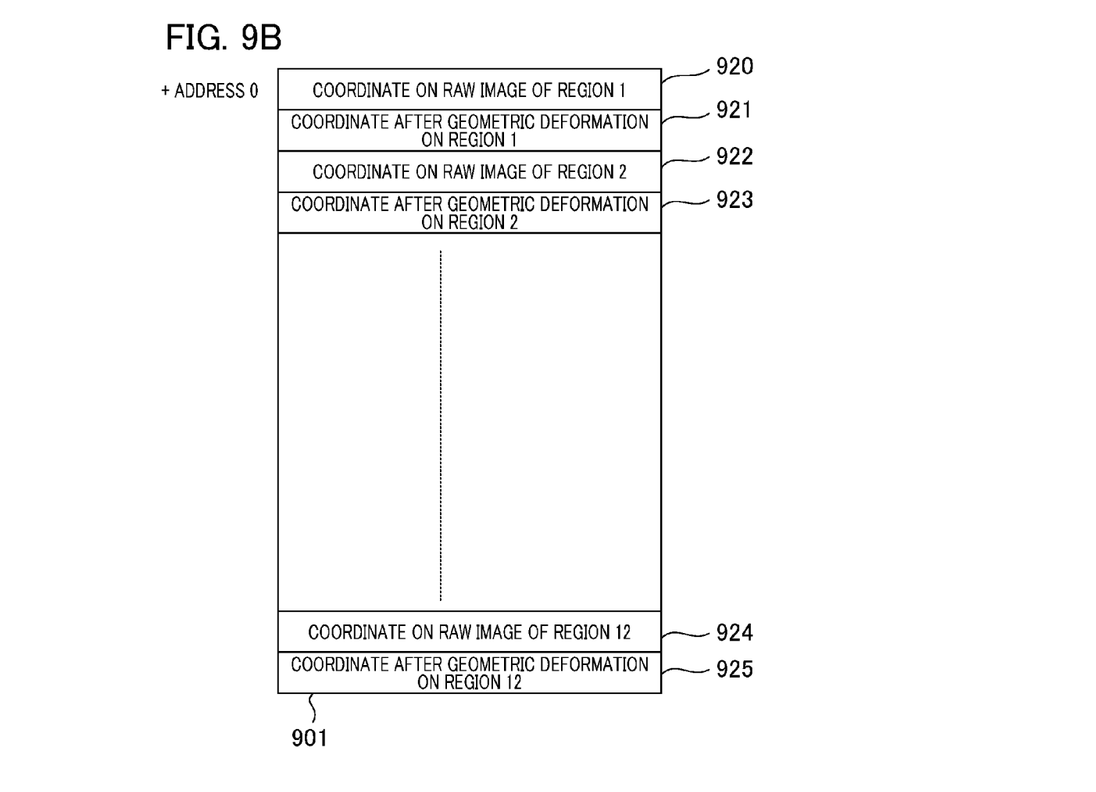

The geometric deformation parameter recorded in each frame header region indicates a movement amount during geometric deformation in a predetermined number of vertices. If the processing for performing the different geometric deformation by color as the chromatic aberration of magnification is included, the movement amount during geometric deformation includes information indicating each movement amount of R·G·B colors. In contrast, if the different geometric deformations are not performed by color (all the color components have a similar geometric deformation), the movement amount indicates one movement amount during geometric deformation. More specifically, in the example of FIG. 3, the processing for dividing the image data into three in the vertical direction and into four in the horizontal direction is performed and 4×3=12 pieces of moving amount information is acquired. FIG. 9A illustrates an example of a region index 900 corresponding to the divided region in FIG. 3, and illustrates a region 1 to a region 12 on which a provisional index (see reference numbers 912 to 910) is indicated in each of the divided regions. The movement information acquired for each divided region is recorded in the frame header region as shown in FIG. 9B. For example, the geometric deformation parameter corresponding to the index 910 of the region 1 includes a coordinate on RAW image of region 1 (920) and a coordinate after geometric deformation on region 1 (921). Similarly, the geometric deformation parameter corresponding to the index 911 of the region 2 includes a coordinate on RAW image of region 2 (922) and a coordinate after geometric deformation on region 2 (923). Therefore, the coordinate on RAW image which is a characteristic point on the RAW moving image to be recorded is paired with the coordinate after geometric deformation that is a movement destination coordinate, and then all data (region 1 to region 12 in FIGS. 9A and 9B) are recorded in the frame header region. In this case, the coordinate data (the geometric deformation parameter) may be presented in association with each of all image data, or may be recorded in association with the image data at a predetermined frame interval (for example, such as a pair of two frames). In this specification, the coordinate value acquired by the above processing refers as the geometric deformation parameter. However, if the geometric deformation is simplified (for example, the geometric deformation is approximated to the projection conversion), the data processed into such a conversion coefficient may be recorded in the storage medium.

Figure 6:
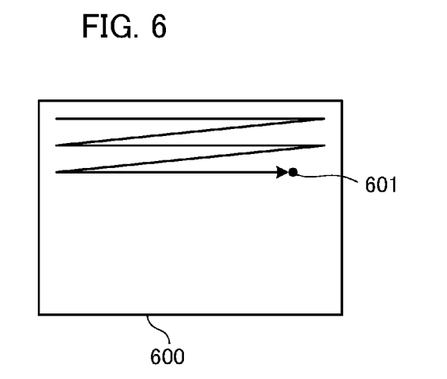
FIG. 6 is a diagram illustrating a coordinate scanning during output.

Next, reproducing processing of the recorded moving image will be described. The RAW moving image of which the data is recorded in the storage medium is recorded in association with the geometric deformation parameter indicating an input coordinate corresponding to an output coordinate of the geometric deformation. In the reproducing processing, a reproducing unit 113 (see FIG. 1) performs scanning in sequence in accordance with a display control for the output coordinates as shown in FIG. 6. In a coordinate space of the output image 600 shown in FIG. 6, the scanning performed from upper left to right is performed in sequence from top to bottom, and then the input coordinate, which is a coordinate (a focused coordinate 601) at a focused point, corresponding to the output coordinates (x, y) is calculated.

Figure 7:
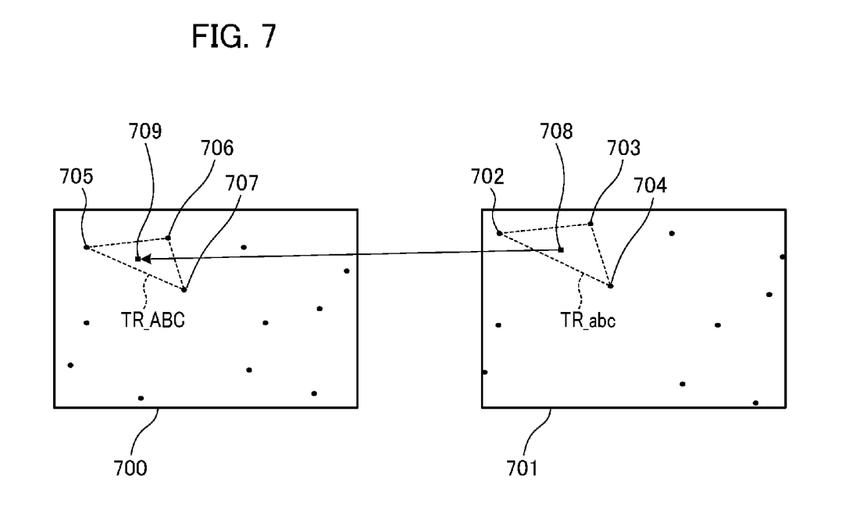
FIG. 7 is a diagram illustrating coordinate interpolation during the geometric deformation to FIG. 4.

FIG. 7 is a diagram illustrating coordinate interpolation processing during the geometric deformation, and illustrates the image in the case of reading out the geometric deformation parameter calculated and recorded in the storage medium in FIG. 4. The coordinates in the image data 700 illustrate coordinates corresponding to each of a focused coordinate about an image 701, which is an output image, after the geometric deformation and the coordinate of the point adjacent to the focused coordinate. A focused coordinate (x, y) shown in a coordinate point 708, and a coordinate a, a coordinate b, and a coordinate c as the geometric deformation parameter in points 702 to 704 adjacent to the focused coordinate are respectively illustrated. In FIG. 7, the focused coordinate (x, y) of the coordinate point 708 presented in a first triangle TR_abc (see dotted lines) having three vertices shown in the coordinate a, the coordinate b, and the coordinate c is illustrated. In order to calculate a position on the input image (one image in the RAW compression moving image) corresponding to the output position, the processing for specifying three points: the coordinate a, the coordinate b, and the coordinate c adjacent to the focused coordinate (x, y) is performed. Then, a positional relationship between the graphic (triangle TR_abc) formed by the points in which a plurality of coordinates that are the geometric deformation parameter indicate and the focused coordinate (x, y) are calculated. Each of the points 702 to 704 adjacent to the focused coordinate (x, y) is the coordinate a, the coordinate b, and the coordinate c, respectively, and a coordinate A, a coordinate B, and a coordinate C each corresponding to each coordinate in the image data 700. The coordinates of a coordinate point 705 on the input image corresponding to the coordinate a of the coordinate point 702 are referred to as "coordinate A". The coordinates of a coordinate point 706 on the input image corresponding to the coordinate b of the coordinate point 703 is referred to as "coordinate B", and a coordinate of a coordinate point 707 on the input image corresponding to the coordinate c of the coordinate point 704 is referred to as "coordinate C". Similarly, the processing for calculating a coordinate (x, y) of a coordinate point 709, which is presented within a second triangle TR_ABC having three vertices shown in the coordinate A, the coordinate B, and the coordinate C, is performed. The coordinates (x, y) of the coordinate point 709 can be calculated as the coordinate of the point indicating the positional relationship corresponding to the focused coordinate (x, y) in a correspondence relationship between three vertices of the first triangle TR_abc and three vertices of the second triangle TR_ABC. In the image data, the desired geometric deformation is achieved by outputting a pixel value at the position of the calculated coordinates (x, y) as a pixel value at the coordinates (x, y) on the output image 701. Therefore, the processing for calculating the positional relationship between the coordinate points that constitute the graphic to calculate the coordinates corresponding to each other is performed using a common interpolation such as a linear interpolation or a spline interpolation. The data output by the reproducing unit 113 is a developing processed by the developing unit 103 and then displayed by the display unit 104.

In the present embodiment, when the geometric correction is performed for the RAW moving image data, all information required for the geometric correction need not be added. Therefore, an inexpensive low-speed storage medium can be used. Since the geometric correction such as the image shake correction, various aberration corrections, and the rolling shutter correction can be performed with a small calculation a during processing the RAW moving image data, an increase of a recording amount of the data including the additional information can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-005791, filed Jan. 15, 2015, which is hereby incorporated by reference wherein in its entirety.

What is claimed is:

1. An image processing apparatus, comprising:
a compression unit configured to compress image data of an image captured through an optical system;
an extraction unit configured to acquire the image data and extract a feature amount of the image;
a coordinate selection unit configured to acquire the feature amount extracted by the extraction unit and select a plurality of coordinates having a relatively high feature amount;
a movement detection unit configured to detect a movement of coordinate points according to the plurality of coordinates selected by the coordinate selection unit;
a generation unit configured to acquire the movement of the coordinate points detected by the movement detection unit and lens information according to the optical system to generate a geometric deformation parameter; and
a recording unit configured to record the geometric deformation parameter generated by the generation unit as additional information in association with each frame, for the image data compressed by the compression unit.

2. The image processing apparatus according to claim 1, wherein the coordinate selection unit divides a region of the image according to the image data and acquires the feature amount for each divided region from the extraction unit to select the plurality of coordinates.

3. The image processing apparatus according to claim 1, wherein the extraction unit comprises:
a plurality of filter units configured to process the image data; and
a selection unit configured to select one output value by comparing the output values of the plurality of filter units to output as the feature amount.

4. The image processing apparatus according to claim 1, wherein the lens information includes a lens position and information about distortion or chromatic aberration of magnification, and
wherein the geometric deformation parameter serves as a parameter used for processing for correcting an image shake and a correction of the distortion or the chromatic difference of magnification, and indicates a movement amount of the plurality of coordinate points in the geometric deformation.

5. The image processing apparatus according to claim 1, further comprising:
a shake detection unit configured to output a shake detection signal,
wherein the generation unit acquires the shake detection signal and generates the geometric deformation parameter, and
wherein the geometric deformation parameter serves as a parameter used for a processing for correcting an image shake and a rolling shutter distortion correction.

6. The image processing apparatus according to claim 1, wherein when the recording unit records the geometric deformation parameter in a storage medium, the recording unit records a paired data of a plurality of coordinate data indicating the coordinates of the image data and geometric deformed coordinate data corresponding to each of the coordinate data together with an image data that is compressed, and a development processing is not performed.

7. An image pickup apparatus comprising:
the image processing apparatus according to claim 1; and
an imaging unit configured to output image data of an image captured through the optical system.

8. The image pickup apparatus according to claim 7, further comprising:
a correction unit configured to correct the image shake of the image using the geometric deformation parameter.

9. The image pickup apparatus according to claim 7, further comprising:
an aberration correction unit configured to correct distortion or chromatic aberration of magnification of the lens of the optical system using the geometric deformation parameter.

10. The image pickup apparatus according to claim 7, further comprising:
a distortion correction unit configured to perform a rolling shutter distortion correction using the geometric deformation parameter.

11. An image pickup apparatus comprising:
the image processing apparatus according to claim 1;
an imaging unit configured to output image data of an image captured through the optical system; and
a reproducing unit configured to acquire the compressed image data and the geometric deformation parameter and perform a coordinate interpolation processing during a geometric deformation to thereby output a pixel value.

12. An image processing method for performing an image processing and a recording processing in an image pickup apparatus, the method comprising:
compressing image data of an image captured through an optical system;
acquiring the image data and extracting a feature amount of the image;
acquiring the feature amount extracted in the extracting and selecting a plurality of coordinates having a relatively high feature amount;
detecting a movement of coordinate points according to the plurality of coordinates selected in the selecting;
acquiring the movement of the coordinate points detected by the movement detection unit and lens information according to the optical system to generate a geometric deformation parameter; and
recording the geometric deformation parameter generated as additional information in association with each frame, for the image data compressed by the compression unit.

* * * * *